3,056,720
AGRONOMIC PRACTICE FOR THE PROTECTION
OF CROPS AND NEW COMPOSITION OF MATTER
Charles R. Youngson, Long Beach, and Cleve A. I.
Goring, Garden City, Calif., assignors to The Dow
Chemical Company, Midland, Mich., a corporation of
Delaware
No Drawing. Filed Oct. 30, 1959, Ser. No. 849,740
9 Claims. (Cl. 167—22)

The present invention relates to fumigant compositions and is particularly concerned with a new fumigant composition and an agronomic practice for improving the ability of soil to support plant growth.

It is an object of the present invention to provide a new fumigant composition. A further object is to supply a new agronomic practice and composition for improving the plant growing properties of soil and the ability of soil to support the growth of crops. Another object is the provision of a new method and composition for improving the emergence, seedling growth and the harvest of crop plants. A further object is the provision of a new method and composition for treating soil to obtain improved controls of soil-dwelling invertebrate organisms such as wire worms and nematodes. An additional object is the provision of a new method and composition for treating soil which will accomplish the stimulation of the growth of crops. Other objects will become apparent from the following specification and claims.

The new fumigant composition of the present invention comprises about one part by weight of 1,2-dibromo-3-chloropropane in admixture with from about 0.3 to 9 parts by weight of methyl bromide. While this composition advantageously may be employed in many types of fumigation operations, it conveniently adapts itself to the treatment of soil or other growth media to improve the ability of the soil to support plant growth and to benefit the plants grown in the treated soil. Such practice protects the plants from the ravages of soil-dwelling invertebrate organisms which attack their roots and improves the growth and harvest of crop plants. It has also been found that the treatment accomplished changes in the soil which stimulate the growth and improve the growth characteristics of crops grown therein. It is among the advantages of the present invention that the toxicants in the mixture appear to be mutually activating so that a greater than additive, or synergistic, result is accomplished as regards the effect on the plant growing properties of the soil and a control of insect and other undesirable organisms and particularly invertebrates such as wire worms and nematodes.

The composition comprising the mixture of toxicants is sufficiently increased in effectiveness so as to permit the effective utilization of reduced amounts of 1,2-dibromo-3-chloropropane and of methyl bromide on soil and the obtaining of crop yields and controls of soil-dwelling organisms which are much superior to those obtained when either of the constituents of the mixture is employed alone. An additional advantage is that these reduced effective dosages of the mixture of toxicants materially reduce the hazards of soil residues. Thus, the practice of the present invention provides a very desirable economic advantage for the agriculturalist.

1,2-dibromo-3-chloropropane is a mobile liquid which boils at 185° C. at atmospheric pressure and methyl bromide is an easily liquefied gas which boils at 4.5° C. at atmospheric pressure. Mixtures of the compounds are somewhat soluble in many organic solvents and of low solubility in water and are adapted to be readily and conveniently distributed in soil. It is among the advantages of the present invention that mixtures of these compounds, while sufficiently persistent to accomplish the desired effect upon the soil and upon the soil inhabiting organisms, dissipate in a reasonable period of time. Still another advantage is that mixtures of these compounds permeate soil for a distance of several inches from the point of application depending upon the temperature, organic content, moisture content, compactness and physical consistency of the soil or growth media.

In carrying out the improved agricultural practice of the invention, the 1,2-dibromo-3-chloropropane and methyl bromide may be mixed together and such mixtures employed directly in parasiticidal dosages for the treatment of soil. However, the present invention also embraces the employment of gaseous, liquid or dust compositions containing the mixture of toxicants and for any fumigant purpose where the composition is useful. Thus, the mixture of toxicants may be dissolved in a suitable liquid carrier to provide compositions adapted to be distributed in soil. Such liquid compositions may also be employed to fumigate the surfaces of certain fruits, vegetables and grains where these products tolerate the fumigation action. Similarly, the 1,2-dibromo-3-chloropropane and methyl bromide may be dispersed on or in a granular or finely divided solid carrier to provide compositions adapted to be distributed in soil or employed as concentrates and subsequently diluted with additional inert carrier to produce the ultimate treating compositions. In a further mode of operation, the 1,2-dibromo-3-chloropropane and methyl bromide may be blended with a suitable surface-active dispersing agent with or without one or more liquid carriers to provide concentrates suitable for dispersion in water to prepare soil treating compositions in the form of aqueous dispersions or emulsions.

The compositions of the invention may be prepared in any suitable fashion. Since 1,2-dibromo-3-chloropropane and methyl bromide are miscible in all proportions, compositions without carriers may be prepared by simple mixing of the components at convenient temperatures. In the preparation of compositions containing a liquid organic carrier, 1,2,-dibromo-3-chloropropane and methyl bromide are thoroughly mixed in the liquid organic carrier at convenient temperatures. Suitable organic carriers include liquid aliphatic and aromatic hydrocarbons such as toluene, xylenes, naphthas and hydrocarbon mixtures derived from the distillation of petroleum or coal, and other organic solvents such as acetone. For some fumigation operations such carriers as carbon tetrachloride or ethylene dichloride may be employed. In general, it is preferred to avoid liquid carriers having such low flash points as to constitute a fire hazard or such high boiling points as to leave undesired residues after use of the compositions. Depending upon the concentration of the mixture of toxicants, such augmented compositions are adapted to be distributed in the soil or otherwise, or employed as concentrates and subsequently diluted with additional carrier to produce the ultimate treating compositions.

In a preferred embodiment of the invention, selected petroleum distillates are employed as liquid carriers. Petroleum distillates used in such embodiment are carefully fractionated portions boiling almost entirely under 400° F. at atmospheric pressure and having a flash point above about 80° F. These fumigant compositions are characterized by excellent penetrating properties and by low fire hazard to the shipper and user.

In preparing dispersible concentrate compositions, the 1,2-dibromo-3-chloropropane and methyl bromide are mixed in the proportions previously set forth together with a surface-active dispersing agent soluble in the composition with or without the further addition of a liquid organic carrier. The surface-active agents are usually employed in the amount from about 1 to about 20 percent by weight of the combined weight of the toxicant mixture and surface-active agent. Suitable surface-active dispersing agents include polyoxyalkylene derivatives of alcohols, phenols and organic acids, oil-soluble petroleum sulfonates; polyoxyethylene derivatives or glycerol and glycols; and the like.

In compositions in which 1,2-dibromo-3-chloropropane and methyl bromide are dispersed on or in a granulated or finely divided solid carrier, the components may be added directly to the solid carrier with mechanical mixing. Alternatively, the components may be combined with one or more of the aforementioned liquid organic carriers and the resulting compositions admixed with the solid carrier. Suitable solid carriers include silica gel, wood flour, fuller's earth, chalk, gypsum and the like.

In formulating the compositions, it is essential to maintain proportions from about one part by weight of 1,2-dibromo - 3 - chloropropane to about 0.3 to 9 parts by weight of methyl bromide and to provide an effective amount of said mixture in the finished composition in order to obtain the desired synergistic effect. The concentration of the mixture of toxicants in organic solvent compositions employed to supply the desired dosage is generally from about 10 to about 85 percent by weight. With aqueous compositions, the required dosage is generally supplied with compositions containing from about 1 to about 50 percent, although concentrations of 0.0002 percent by weight may be conveniently employed in irrigation treatments of soil. In compositions wherein the active mixture is dispersed on a solid carrier, it is generally desirable to employ from about 1 to about 30 percent by weight of the above mixture of active ingredients in the finished solid composition. With high capacity carriers, such as silica gel, the active ingredients may amount to 50 percent by weight or more of the solid composition. In any case, it is desirable to employ sufficient of the solid carrier so that the liquid composition is sorbed to provide a free-flowing solid mixture. In compositions to be employed as concentrates, the toxicant mixture oftentimes is present in a concentration from about 5 to about 95 percent by weight.

The soil may be treated with the toxicant mixture or a composition containing the mixture of toxicants in any suitable fashion. With liquid compositions, good results have been obtained by depositing the active fumigant mixture at regular intervals beneath the surface of the soil. Such deposition may be accomplished readily by automatic machinery or by hand-operated apparatus. Thus, the active composition may be sprayed or otherwise deposited in a furrow which is subsequently closed to keep the active agents in the desired zone of the soil to be treated. Alternatively, the liquid composition may be injected into the soil at predetermined intervals. In any case, the active composition is usually deposited at a depth from about 4 to about 18 inches below the soil surface.

In row treatments it is advantageous to place the fumigant composition at least 12 inches below the surface of the seed bed and to seal in the fumigant by listing the soil or by other suitable means such as ring rollers or press sealers attached behind the applicator. In overall applications with chisel-type applicators, the fumigant composition may be applied in uniform treatments 1 to 12 inches apart at a depth of 6 to 8 inches. With plow-sole applications, it is desirable to employ about 8 inches spacing between the furrows and to spray or otherwise introduce the fumigant composition so as to cover the bottom of the furrow. Where injection of the active composition at intervals is employed, good results are obtained when injecting at intervals from 3 to about 12 inches, although somewhat greater intervals may be employed in certain cases. In the above operations, it is desirable to apply the fumigant composition after the soil has been worked into seed bed condition and when the soil temperature is above 50° F. and the soil moisture content is sufficient for seed germination.

In another mode of operation, the fumigant composition in emulsifiable form may be dispersed in water employed to irrigate the soil. In this method, the amount of water may be varied in accordance with the porosity and water-holding capacity of the soil in order to obtain the desired depth of distribution of the toxicant mixture.

The amounts of the 1,2-dibromo-3-chloropropane and methyl bromide composition to be employed will vary depending upon such factors as the type and condition of the soil, the varieties and growth stages of soil pests to be controlled and the particular crop to be planted thereafter. The essential criterion is to employ an amount for accomplishing the desired effect upon the soil-dwelling invertebrate organisms and the plant growing properties of the soil. In general, good results are obtained when the mixture of toxicants is distributed in growth media to a depth of from 4 to 12 inches at a dosage of at least one pound per acre. In field applications, the mixture of toxicants is usually introduced into the soil at a depth of about 6 inches and at a dosage of from 1 to 50 pounds per acre. Where compositions embodying a liquid or solid carrier are used, the amount of composition is adjusted to distribute substantially the above described amounts of the active toxicant mixture per acre. The required amount of the toxicant mixture in the soil may conveniently be supplied per acre treated in from about 10 to 100 gallons of organic solvent carrier, in from 10 to 162,000 gallons or more of the aqueous carrier or in from about 50 to 1,000 pounds or more of the solid carrier.

In one embodiment of the invention, the treated soil is planted with the desired crop plant following the distribution of the toxicant compounds in the soil. Where minimum dosages of the toxicant compounds are distributed in soil, the treated soil may be immediately planted with the desired crop. Following the distribution of larger dosages of the toxicant compounds, it is desirable that any planting operation not be carried out for a period of from several hours to several days, the exact period depending upon the concentration of the toxicant compounds in the soil and the resistance of the species concerned to the compounds. Where the mixture of toxicant compounds is employed for the treatment of the soil adjacent to the root system of established plants having resistance to the compounds and in side dressing operations, the existing vegetation is not unfavorably affected by minimum effective concentrations of the toxicant compounds temporarily present in the soil.

Illustratively, beneficial results were obtained by injecting acetone solutions of the active fumigants of the present invention into sandy loam soil naturally infested with root-knot nematodes.

Specifically, acetone solutions of 1,2-dibromo-3-chloropropane and methyl bromide were prepared at concentrations sufficient to provide desired dosages in pounds per acre foot by application of 0.1 milliliter of said solution to 150 grams of soil. The infested sandy loam soil was placed in 4 ounce sealable jars and thereafter treated with the foregoing solutions by injection. The jars of treated soil were then sealed and set aside at about 70° F. for one week.

Following the one week interval the containers were unsealed and the soil allowed to aerate for one week and thereafter planted with three cucumber seeds. During the subsequent growing period, no adverse effect attributable to the presence of residual fumigaant upon the growth of the seedlings was observed. After the cucumbers had been allowed to grow for a sufficient period that root-knot nematode galls were developed in the various containers, the cucumber roots were washed, inspected for gall formation, and noted in the following manner:

TABLE I

*Toxicity of Fumigants to Root-Knot Nematodes*

| Samples | Pounds Per Acre-Foot | | Percent Control of Nematodes |
|---|---|---|---|
| | Methyl Bromide | 1,2-Dibromo 3-chloropropane | |
| 1 | 35 | | 80 |
| 2 | 31 | | 54 |
| 3 | 28 | | 63 |
| 4 | 23 | | 44 |
| 5 | 16 | | 8 |
| 6 | | 3 | 99 |
| 7 | | 2 | 90 |
| 8 | | 1.5 | 64 |
| 9 | | 1.4 | 53 |

In a manner identical to that described above, additional tests were run for various mixtures of 1,2-dibromo-3-chloropropane and methyl bromide at dosages specified in the following table. The actual control results obtained from these tests are compraed with "Expected" control computed in accordance with the graphical approximation method for similar joint effect of ingredients of the mixture, as presented in Wadley, The Evidence Required to Show Synergistic Action of Insecticides and a Short Cut in Analysis, United States Department of Agriculture, Publication EP-223, June 1945.

TABLE II

*Toxicity of Combinations of Methyl Bromide and 1,2-Dibromo-3-Chloropropane Fumigants to Root-Knot Nematodes*

| Combination Proportions | | Pounds Per Acre Foot | | Percent Control of Nematodes | |
|---|---|---|---|---|---|
| Methyl bromide | 1,2-Dibromo-3-chloropropane | Methyl bromide | 1,2-Dibromo-3-chloropropane | Actual | Expected |
| 18 | 2 | 4.5 | 0.5 | 60 | 5 |
| 15 | 5 | 3 | 1 | 66 | 36 |
| 10 | 10 | 1 | 1 | 59 | 26 |
| 5 | 15 | 0.25 | 0.75 | 41 | 7 |

Additionally, compositions of the fumiganats containing about 1 part by weight of 1,2-dibromo-3-chloropropane and from about 0.3 to about 9 parts by weight of methyl bromide were admixed with the following adjuvants: (1) finely divided inert solids, such as silica gel and the like; (2) emulsifying and dispersing agents such as dimeric alkylated aryl polyether alcohols, alkyl aryl sulfonates and the like; and (3) low boiling petroleum hydrocarbon distillates, such as Stoddard solvent, Standard Thinner 250, and the like. The amount of such adjuvants employed in these compositions may vary from 50 to 99 weight percent of the finely divided inert solids, from 1 to 20 weight percent of the emulsifying and dispersing agents and from 15 to 90 weight percent of the petroleum distillates. The compositions obtained with the petroleum distillates had at least a flash point greater than 100° F., and contain about 15 weight percent of the fumigants.

The concentrate compositions as above described are adapted to be dispersed in water to produce aqueous compositions having very desirable wetting and penetrating properties. The latter aqueous compositions and the above described solvent fumigant compositions are adapted to be employed to treat soil and to distribute the mixture of fumigants therein in effective concentrations. Use of such fumigant compositions gives results comparable to those tabulated above.

The compositions of the present invention as hereinbefore described are dispersed in water to produce a material containing about 20 pounds of the respective toxicants per 200 gallons of ultimate material. The dispersion, while under agitation, is metered into irrigation water at the pump outlet at the rate of 2 gallons per 1,000 gallons of irrigation water. The water is in a state of turbulent flow as it comes from the pump which provides for the thorough mixing of the toxicants therein. About 2 acre inches of irrigation water is applied per acre to land heavily infested with wire worms and root-knot nematodes to accomplish a wetting of the soil to a depth of about 12 inches. Two weeks after the treatment, the soil is planted. In a check operation, adjacent but similarly infested soil is also planted. Eight weeks after seeding, the plots are inspected and representative plants lifted from the soil and their roots examined for evidence of wire worm and nematode attack. The examination indicates a commercial control of both soil organisms in the treated soil, with severe infestation in the check plots.

The foregoing examples are included to illustrate the invention, and are not to be construed as limiting it thereto. Various modifications can be made in the present invention without departing from the spirit or scope thereof for it is understood that we limit ourselves only as defined in the appended claims.

We claim:

1. A fumigant composition comprising, as active toxic ingredients, about 1 part by weight of 1,2-dibromo-3-chloropropane and from about 0.3 to 9 parts by weight of methyl bromide, the active toxic ingredients of said composition being mutually activating.

2. A fumigant composition comprising a carrier and dispersed therein as active toxic ingredients about 1 part by weight of 1,2-dibromo-3-chloropropane and from about 0.3 to 9 parts by weight of methyl bromide, the active toxic ingredients of said composition being mutually activating.

3. A composition comprising, as active toxic ingredients, about 1 part by weight of 1,2-dibromo-3-chloropropane and from about 0.3 to 9 parts by weight of methyl bromide in intimate admixture with an inert carrier.

4. A composition claimed in claim 3 wherein the active toxic ingredients are admixed with a finely divided inert solid.

5. A composition claimed in claim 3 wherein the active toxic ingredients are admixed with a petroleum distillate.

6. A composition claimed in claim 3 wherein the active toxic ingredients are admixed with a surface-active dispersing agent.

7. A fumigant composition which comprises an aqueous dispersion of the composition claimed in claim 3 wherein the active toxic ingredients are admixed with a surface-active dispersing agent, and said active toxic ingredients being present in the amount of at least 0.0002 percent by weight.

8. In the practice of agricultural economy, the method which comprises treating soil with a parasiticidal dosage of a composition comprising about 1 part by weight of 1,2-dibromo-3-chloropropane and from about 0.3 to 9 parts by weight of methyl bromide.

9. In the practice of agricultural economy, the method which comprises treating soil with a parasiticidal dosage of a composition comprising as active toxic ingredients about 1 part by weight of 1,2-dibromo-3-chloropropane and from about 0.3 to 9 parts by weight of methyl bromide in intimate admixture with a petroleum distillate.

References Cited in the file of this patent

UNITED STATES PATENTS

| 2,606,857 | Dawson | Aug. 12, 1952 |
| 2,849,361 | Youngson | Aug. 26, 1958 |